March 24, 1970     P. L. RICHMAN ET AL     3,502,977

LOW FREQUENCY MEASURING APPARATUS WITH PHASE LOCKED LOOP

Filed March 13, 1967     2 Sheets-Sheet 1

INVENTORS
PETER L. RICHMAN
JAMES L. WEST

BY Arnold, Roylance, Kruger & Durkee

ATTORNEYS

INVENTORS
PETER L. RICHMAN
BY JAMES L. WEST
Arnold, Roylance, Kruger & Durkee
ATTORNEYS United States Patent Office 3,502,977
Patented Mar. 24, 1970

3,502,977
LOW FREQUENCY MEASURING APPARATUS WITH PHASE LOCKED LOOP
Peter L. Richman, Lexington, and James L. West, Concord, Mass., assignors to Weston Instruments, Inc., Newark, N.J., a corporation of Delaware
Filed Mar. 13, 1967, Ser. No. 622,573
Int. Cl. G01r 23/12
U.S. Cl. 324—82                                    9 Claims

ABSTRACT OF THE DISCLOSURE

A high frequency oscillator is phase and frequency locked at a frequency N times that of a low frequency oscillator. The frequency of the high frequency oscillator is measured to yield a measure of the low frequency which is difficult to measure directly with high resolution in a reasonable time.

---

This invention relates to apparatus for measuring the frequency of an electrical signal, and more specifically to frequency measuring apparatus usable to analyze signals having low frequencies.

It is frequently necessary to measure the frequency of an electrical signal with considerable accuracy when the frequency of the signal is known to be very low, e.g., on the order of 10 Hertz. Also it is desirable to be able to adjust the frequency of a very low frequency (VLF) oscillator to a preselected value where the oscillator output is to be used, for example, to perform other measuring and testing operations.

One method of performing a VLF frequency measurement is to apply the output of the VLF source to a counting device of the type known as an events-per-unit-time counter, or EPUT counter, which simply counts the number of axis crossings of the VLF signal. The axis can be zero or some other level. This method is quite suitable for high frequency signals, but to make a VLF measurement with accuracy many axis crossings must be counted. The time required to make the count is so great as to render the method impractical. As an example, if a 10 hertz signal is to be measured with 0.01% accuracy, axis crossings must be counted for 1,000 seconds, i.e., over 15 minutes.

It is also possible to measure the elapsed time between axis crossings and to convert this information into frequency. This approach requires that the operation $$f = 1/T$$

be performed, which is difficult to implement electronically.

One object of the invention is to provide an apparatus for accurately measuring the frequency of a low frequency electrical signal in a short period of time.

Another object is to provide an apparatus for accurately adjusting the frequency of a low frequency oscillator to a preselected value.

A further object is to provide an apparatus for measuring the frequency of a low frequency signal by establishing the frequency of a high frequency oscillator at an integral multiple of the low frequency signal and then measuring the high frequency.

Yet another object is to provide apparatus for measuring a low frequency by generating a high frequency at an integral multiple of the low frequency, precisely controlling the high frequency by a phase locked loop and measuring the high frequency directly.

The invention includes a high frequency oscillator which can be adjusted to produce a signal which is approximately an integral multiple of a low frequency signal to be measured. The high frequency is scaled down by a scaler or divider apparatus which divides the high frequency signal by the same integer, typically on the order of 100 or 1,000. The scaled HF signal is compared with the LF signal in a phase detector the output of which is a DC signal. The DC signal is filtered and fed back to further adjust the frequency of the HF oscillator to an exact multiple of the LF signal. The frequency of the HF signal is then precisely measured, the resulting measurement being a measure of the LF signal multiplied by the integer.

In order that the manner in which the above and other objects are attained in accordance with the invention can be understood in detail, reference is made to the accompanying drawings, which form a part of this specification and wherein.

Figure 1:
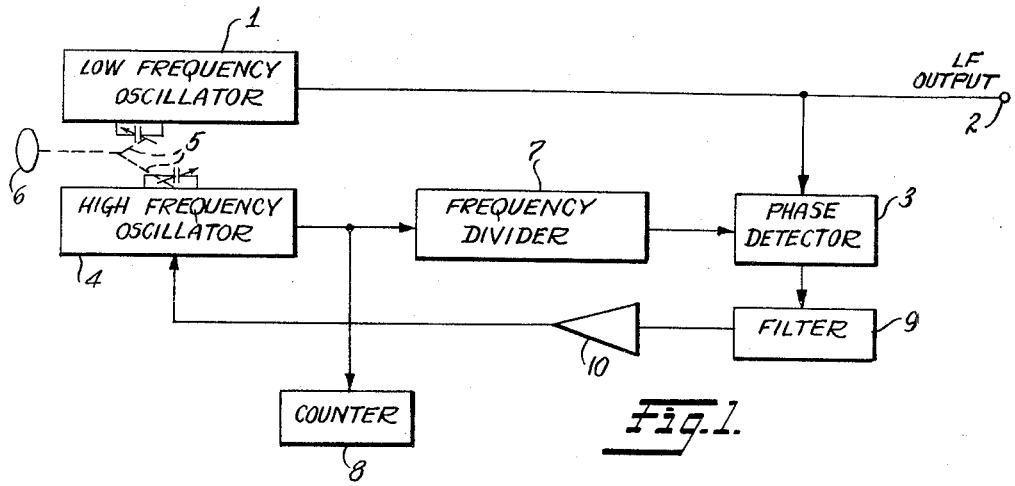
FIG. 1 is a block diagram of an apparatus in accordance with one embodiment of the invention.

Referring now to FIG. 1, the apparatus includes a low frequency oscillator 1 which is capable of producing an electrical signal having a relatively low frequency, on the order of, for example, 10 hertz. The output of oscillator 1 is connected to an output terminal 2 which is connectible to a utilization device. The output of oscillator 1 is also connected to one input of a phase detector circuit 3 which can be any conventional form of phase detector which produces a unidirectional signal having a characteristic proportional to the phase difference between two input signals applied thereto, this signal being, for example, a varying DC signal or a series of pulses of varying magnitude, width, or spacing.

A high frequency oscillator 4 is capable of producing a signal which is substantially higher than the frequency of oscillator 1 and is variable over a range of, for example, 100 kHz. to 1 mHz. If the apparatus of FIG. 1 is to be used to generate a low frequency signal which is to then be used to test the frequency response or some other characteristic of an external piece of equipment, it is desirable that both of oscillators 1 and 4 be manually adjustable over a preselected range. These oscillators will then each contain variable value frequency determining elements which are mechanically coupled to each other such as by a mechanical interconnection indicated schematically at 5, this mechanical interconnection also being connected to an adjustment knob 6. In addition, oscillator 4 can be voltage variable so that the frequency of oscillator 4 can be controlled, for any preselected setting of the manual adjustment, over a relatively narrow frequency range by application of a variable DC voltage to an input control terminal. The output of oscillator 4 is connected to a frequency divider circuit 7 and to the input of a conventional counter circuit 8 of the type which is capable of counting events per unit time. Counter 8 is of the type which is frequently referred to as an EPUT meter, and can be designed to count the number of zero or axis crossings within a preselected period of time, for example, one second.

Frequency divider 7 is a conventional frequency dividing apparatus capable of accepting an input signal and producing an output signal the frequency of which is a fraction $1/D$ of the input, D being a predetermined fixed integral number. Circuit 7 can include a plurality of bistable circuits and, if desired, wave shaping circuits and the like to produce an output signal having particular characteristics.

The output of divider 7 is connected to the other input of phase detector circuit 3. The output of circuit 3, which is proportional to the phase difference between the divided output of oscillator 4 and the output of oscillator 1, is connected to a filter circuit 9 which filters the unidirectional signal produced by the phase detector and delivers a DC signal to the input of an amplifier circuit 10 which amplifies the signal and connects it to the control input terminal of oscillator 4 to correct the frequency of the signal produced by oscillator 4 until it is exactly an integral multiple of the signal produced by oscillator 1, that multiple being the predetermined fixed integer D.

The portion of the frequency correction circuit between phase detector 3 and the control input terminal of oscillator 4 can be replaced by an integrator circuit or, if necessary, by a filter and integrator. An integrator circuit inserted in this manner is more fully described with reference to FIGS. 2 and 4. Regardless of which circuit is used, an important aspect of the operation of the apparatus is that the signal emanating from the phase detector, which normally includes a ripple component, is significantly smoothed before delivery to the control terminal of oscillator 4. With the ripple thus reduced, frequency modulation of the high frequency signal is minimized. It will be evident to those skilled in the art that if the ripple were allowed to remain and the output of oscillator 4 were to be frequency modulated, the accuracy of the system would be severely diminished.

It will be recognized that oscillator 4 need not be of the type which produces a sinusoidal wave, but can be a pulse or square wave oscillator, or any signal generator which produces a signal which can be conveniently divided or counted by divider circuit 7 or counter 8.

The operation of the apparatus of FIG. 1 would seem to be apparent from the above description, but can be summarized as follows. Low frequency oscillator 1 produces a signal the frequency of which cannot be conveniently measured directly. The frequency determining variable value elements in oscillator 1 are mechanically coupled to similar elements in oscillator 4 and are adjusted together so that, for a particular manual adjustment of oscillator 1, the frequency of oscillator 4 is established at approximately an integral multiple of the frequency of oscillator 1. The output of oscillator 4 is divided by divider 7 by the same integer as the frequency of oscillator 4 is greater than the frequency of oscillator 1, the divided signal being compared with the frequency of the output of oscillator 1 by phase detector 3. Any phase difference between the two signals is represented by a DC signal which is filtered and amplified and fed back to a control input terminal of oscillator 4 which refines the frequency thereof and renders the frequency of the output of oscillator 4 an exact integral multiple of the frequency of oscillator 1, that integer being equal to the division ratio of divider 7. The axis crossings or level crossings of oscillator 4 are then directly counted by counter circuit 8, this measurement then being a measurement of the frequency of the oscillator 1 output.

It will be apparent that counter 8 can be provided with any convenient form of display, such as a digital visual display, a printed record, or the like and that the counter can take many possible forms. Whatever counter or display is provided, it will be apparent that by simple scale modification the reading can be made to indicate the frequency of oscillator 1 directly.

Figure 2:
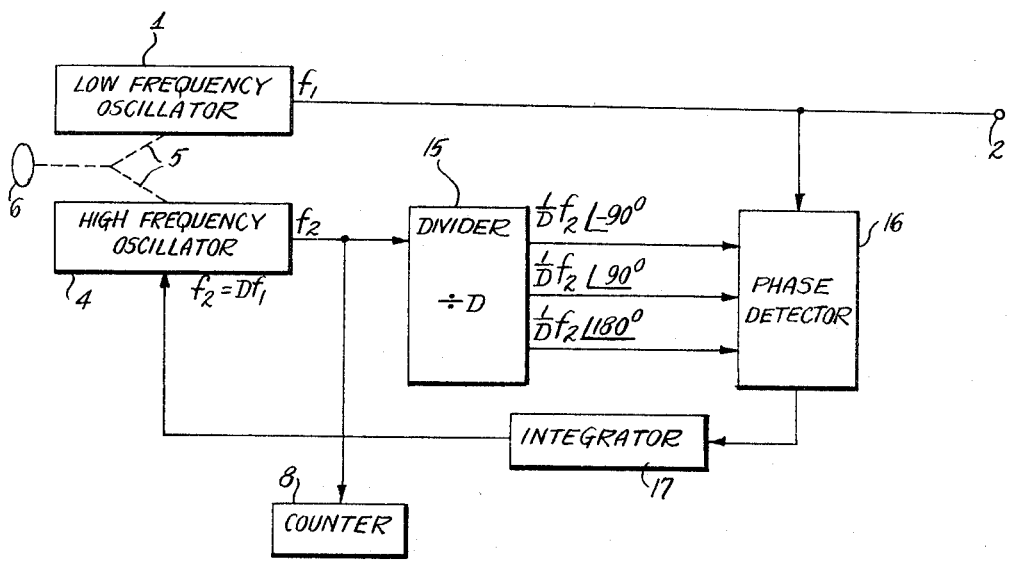
FIG. 2 is a block diagram of an apparatus in accordance with a second embodiment of the invention.

A second embodiment of the apparatus is shown in FIG. 2, wherein the low and high frequency oscillators and the counter are identified by the same numerals as in FIG. 1. The divider circuit of FIG. 2 includes phase shifting means of a conventional type to provide three output signals, each one divided by the factor D, the signals bearing a phase relationship of −90°, +90° and 180° to an arbitrary reference, which when the phase-locked loop is synchronized becomes the oscillator 1 output $F_1$. These three signals are delivered to a phase detector 16 which is especially designed to compare the output signal from oscillator 1 with each of these three outputs of the divider circuit and to yield a DC signal which is characterized by low ripple, especially near the zero phase difference. The output of phase detector 16 is connected to an integrator circuit 17 which provides a DC correction signal to the voltage control terminal of oscillator 4.

It will be recognized from the above discussion that oscillator 4, divider 15, phase detector 16, and integrator 17 are connected in a phase-locked loop such that a continuous correction signal is applied to oscillator 4 to render its frequency a constant integral multiple of the frequency of oscillator 1. As in the apparatus of FIG. 1, counter 8 provides a count per unit time of the level crossings of the output of oscillator 4 which is, in effect, a measure of the frequency of oscillator 1.

Figure 3:
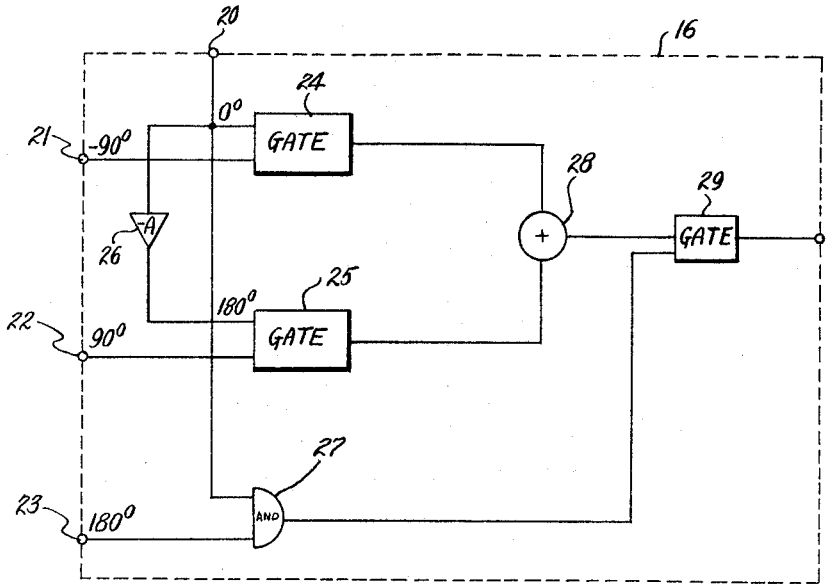
FIG. 3 is a schematic diagram of a phase detector usable in the apparatus of FIG. 2.

FIG. 3 shows a phase detector of the type usable in the apparatus of FIG. 2, the phase detector of FIG. 3 including an input terminal 20 which is connected to the output of oscillator 1 and input terminals 21, 22, and 23 which are connected to the three outputs, respectively, of divider circuit 15. The −90° and +90° signals provided to input terminals 21 and 22 are connected to the inputs of gate circuits 24 and 25, the other inputs of which are connected to the zero and 180° signals from oscillator 1. The 180° signal for gate circuit 25 is obtained by applying the 0° signal to the conventional inverting amplifier 26. The 180° signal from divider circuit 15 and the 0° signal from oscillator 1 are connected to the two input terminals of AND circuit 27. The outputs of gate circuits 24 and 25 are combined in an adder circuit 28 the output of which is applied to one input of a gate circuit 29. The output of AND circuit 27 is connected to the other input terminal of gate circuit 29, the output of gate 29 being the phase detector output signal.

The operation of the circuit of FIG. 3 can be briefly described as follows. The 0° signal from oscillator 1 is applied to input terminal 20 and is switched or gated by the −90° signal applied to terminal 21, and the 180° signal from oscillator 1 is similarly gated by the +90° signal as applied at input terminal 22. The output of each of gates 24 and 25 is a series of pulses representing portions of the 0° and 180° oscillator 1 signals switched through the gates by the divided high frequency signal. These outputs are combined in summing circuit 28 to produce a signal at twice the frequency of the signal applied to input terminals 21 and 22. Simultaneously, the 0° oscillator 1 signal and the 180° divided oscillator 4 signal are logically added in AND circuit 27, the output of that circuit being zero when the two signals are precisely in phase and being something other than zero whenever a phase difference exists. This output signal is used to control the conductivity of gate circuit 29, the duration of the signal allowed to pass through gate circuit 29 being a function of the difference between the phase of the signals applied to input terminals 20 and 23. As described with reference to FIG. 2, the pulses emerging from circuit 29 are integrated and provide a DC signal which varies smoothly with loop phase error to the control terminal of oscillator 4.

Figure 4:
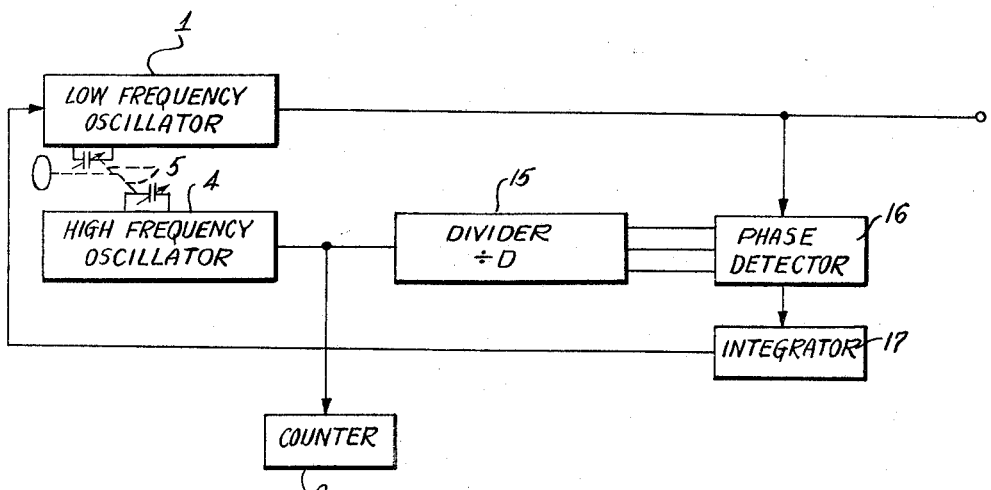
FIGURE 4 is a block diagram of an apparatus in accordance with another embodiment of the invention.

It will be apparent to those skilled in the art that it may be desirable to maintain the frequency of the high frequency oscillator constant and to cause the low frequency source to be adjusted to a matching condition at an exact submultiple of the high frequency signal. An apparatus of this type is shown in FIG. 4 wherein the low frequency source 1 is a voltage variable oscillator, and also can be a manually adjusted oscillator, to which the integrator output signal is applied. Clearly, the same sort of signal as can be used to adjust the high frequency oscillator can also be used to adjust the low frequency oscillator, with appropriate changes in polarity and magnitude. These design changes depend on the actual frequencies and types of oscillators involved.

While certain advantageous embodiments have been chosen to illustrate the invention, it will be understood

What is claimed is:

1. An apparatus for generating a low frequency electrical signal having a frequency in the range of approximately 0–10,000 Hz., and for measuring the frequency of the low frequency signal, comprising the combination of first variable frequency oscillator circuit means for generating a first electrical signal in the 0–10,000 Hz. region; voltage variable frequency oscillator circuit means for generating a second electrical signal in a high frequency region exceeding 10,000 Hz., the frequency of said second signal generated by said voltage variable oscillator circuit means being approximately an integral multiple of the frequency generated by said first oscillator circuit means; divider circuit means connected to the output of said voltage variable oscillator circuit means for dividing the frequency of said second signal by an integer equal to the factor by which said second signal is greater than said first signal; phase comparator circuit means for comparing said first signal and the output of said divider circuit means and for generating a DC voltage proportional to the difference between said signals; circuit means for providing the DC output of said phase comparator circuit means to said voltage variable oscillator circuit means to change the frequency thereof to an exact multiple of said first signal; and counter means connected to the output of said voltage variable oscillator circuit means for counting the axis crossings of said second signal as a function of time and for displaying the count as a measure of frequency of said first signal.

2. An apparatus according to claim 1 wherein said first variable frequency oscillator circuit means is manually variable; and said voltage variable frequency oscillator circuit means is manually variable; and the manual frequency controls for said oscillators are coupled together for simultaneous movement.

3. Apparatus according to claim 1 wherein said circuit means connected between said phase detector circuit means and said voltage variable frequency oscillator circuit means includes integrator circuit means for reducing ripple components in the DC voltage produced by said phase comparator circuit means to minimize frequency modulation of said second electrical signal.

4. An apparatus according to claim 1 wherein the frequency of said second signal is greater than the frequency of said first signal by a factor of approximately 1,000.

5. Apparatus according to claim 1 wherein said divider circuit means comprises a frequency divider circuit, and phase shifting circuit means for shifting the phase of the signal divided by said frequency divider circuit by 90° increments.

6. An apparatus for measuring the frequency of a low frequency electrical signal comprising the combination of an input terminal to which a source of low frequency signals in the order of 1–10,000 Hz. can be applied; a variable oscillator circuit having a control terminal, said variable oscillator including a physically adjustable variable value frequency determining circuit element, said oscillator being variable by adjustment of said circuit element, said variable oscillator further being variable on either side of frequencies established by said adjustment of said circuit element by variation of a control DC voltage applied to said control terminal, the range of variation by said control voltage being smaller than the range of variation obtainable with said variable value circuit element, the lowest frequency of said variable oscillator being greater by a factor $n$ than the lowest frequency of the low frequency signal applied to said input terminal; frequency divider circuit means connected to the output of said variable oscillator circuit for dividing the frequency of the signal generated thereby by a factor $n$; phase comparator circuit means connected to said input terminal and to the output of said frequency divider circuit means for producing an error voltage proportional to the phase difference between the signals provided thereto; circuit means connected to the output of said phase comparator circuit means and to said control terminal; and means connected to the output of said variable oscillator circuit for measuring the frequency of the signal produced thereby.

7. An apparatus according to claim 6 wherein said factor $n$ is on the order of 1,000.

8. Apparatus according to claim 6 wherein said frequency divider circuit means comprises a frequency divider circuit and phase shifting circuit means for shifting the phase of the signal divided by said frequency divider circuit by 90° increments.

9. Apparatus according to claim 6 wherein said circuit means connected to the output of said phase comparator circuit means and to said control terminal includes integrator circuit means for reducing ripple components in said error voltage to minimize frequency modulation of the output of said variable oscillator.

References Cited

UNITED STATES PATENTS

| 2,530,596 | 11/1958 | Blok | 324—79 |
| 2,982,921 | 5/1961 | Rozner et al. | 331—21 X |
| 3,199,037 | 8/1965 | Graves. | |
| 3,218,572 | 11/1965 | Dimmick | 331—44 X |
| 3,286,191 | 11/1966 | Cornwell | 307—233 X |

RUDOLPH V. ROLINEC, Primary Examiner

P. F. WILLE, Assistant Examiner

U.S. Cl. X.R.

331—21

Disclaimer and Dedication 3,502,977.—*Peter L. Richman*, Lexington, and *James L. West*, Concord, Mass. LOW FREQUENCY MEASURING APPARATUS WITH PHASE LOCKED LOOP. Patent dated Mar. 24, 1970. Disclaimer and dedication filed Mar. 17, 1971, by the assignee, *Weston Instruments, Inc.*

Hereby enters this disclaimer to the remaining term of said patent and dedicates said patent to the Public.

[*Official Gazette April 27, 1971.*]